US012418127B2

(12) United States Patent
Noro et al.

(10) Patent No.: US 12,418,127 B2
(45) Date of Patent: Sep. 16, 2025

(54) FEMALE TERMINAL FITTING WITH DURABLE ELASTIC CONTACT PIECE

(71) Applicant: SUMITOMO WIRING SYSTEMS, LTD., Mie (JP)

(72) Inventors: Yutaka Noro, Mie (JP); Masahiro Matoba, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 365 days.

(21) Appl. No.: 17/921,762

(22) PCT Filed: Mar. 24, 2021

(86) PCT No.: PCT/JP2021/012157
§ 371 (c)(1),
(2) Date: Oct. 27, 2022

(87) PCT Pub. No.: WO2021/220674
PCT Pub. Date: Nov. 4, 2021

(65) Prior Publication Data
US 2023/0170639 A1 Jun. 1, 2023

(30) Foreign Application Priority Data
Apr. 30, 2020 (JP) ................................ 2020-080458

(51) Int. Cl.
*H01R 13/11* (2006.01)
*H01R 4/18* (2006.01)
*H01R 13/193* (2006.01)

(52) U.S. Cl.
CPC ........... *H01R 13/114* (2013.01); *H01R 4/185* (2013.01); *H01R 13/193* (2013.01)

(58) Field of Classification Search
CPC ........ H01R 13/10; H01R 13/11; H01R 13/15; H01R 13/111; H01R 13/113;
(Continued)

(56) References Cited

U.S. PATENT DOCUMENTS 5,217,382 A * 6/1993 Sparks .................. H01R 13/20
439/843
6,056,604 A 5/2000 Roy et al.
(Continued)

FOREIGN PATENT DOCUMENTS

JP 2001-210418 A 8/2001
JP 2005-166594 A 6/2005
(Continued)

OTHER PUBLICATIONS

International Search Report issued on Jun. 15, 2021 for WO 2021/220674 A1 (5 pages).

*Primary Examiner* — Abdullah A Riyami
*Assistant Examiner* — Amara Anderson
(74) *Attorney, Agent, or Firm* — Venjuris, P.C.

(57) ABSTRACT

Provided is a female terminal fitting capable of improving the durability of an elastic contact piece. A female terminal fitting (10) includes a tubular main body part (20) and an elastic contact piece (40) extending, inside the main body part (20), from a support point part (41) to a free end part (42) and contacting a partner-side male tab (120) inserted in the main body part (20). The free end part (42) side of the elastic contact piece (40) displaces in the plate thickness direction of the elastic contact piece (40). The main body part (20) has a first regulating part (31) and a second regulating part (32) that come in contact with the elastic contact piece (40) and regulate a displacement range of the free end part (42) side to less than or equal to the plate thickness of the elastic contact piece (40).

7 Claims, 13 Drawing Sheets

(58) Field of Classification Search
CPC .. H01R 13/114; H01R 13/187; H01R 13/193; H01R 4/48; H01R 4/185
USPC ........................................................ 439/816
See application file for complete search history.

(56) References Cited

U.S. PATENT DOCUMENTS

| | | | | |
|---|---|---|---|---|
| 2002/0086590 | A1* | 7/2002 | Mitani | H01R 13/113 439/852 |
| 2006/0172615 | A1 | 8/2006 | Noro et al. | |
| 2006/0172620 | A1 | 8/2006 | Noro et al. | |
| 2017/0040728 | A1 | 2/2017 | Saito et al. | |
| 2017/0237191 | A1 | 8/2017 | Endo et al. | |
| 2020/0083618 | A1* | 3/2020 | Mochizuki | H01R 4/185 |

FOREIGN PATENT DOCUMENTS

| | | | |
|---|---|---|---|
| JP | 2006-294496 | A | 10/2006 |
| JP | 2011-216435 | A | 10/2011 |
| JP | 2014-160544 | A | 9/2014 |

* cited by examiner

FEMALE TERMINAL FITTING WITH DURABLE ELASTIC CONTACT PIECE

CROSS REFERENCE TO RELATED APPLICATIONS

This application is a national phase of PCT application No. PCT/JP2021/012157, filed on 24 Mar. 2021, which claims priority from Japanese patent application No. 2020-080458, filed on 30 Apr. 2020, all of which are incorporated herein by reference.

TECHNICAL FIELD

The present disclosure relates to a female terminal fitting.

BACKGROUND

A female terminal of Patent Document 1 includes a tubular main body part and an elastic contact plate supported inside the main body part and extending from one opening into which a male terminal is inserted toward the other opening. The elastic contact plate is provided with a pair of wings protruding in the width direction. The wings are positioned in holes provided in side plate parts of the main body part. There is a clearance between upper and lower edge parts of the holes and the wings. Movement in the up-down direction is regulated by the wings coming in contact with the upper and lower edges of the holes. The terminal fittings of Patent Documents 2 to 5 are also similarly configured such that movement of an elastic contact plate in the up-down direction is regulated by a regulating part of the main body part.

PRIOR ART DOCUMENT

Patent Document

Patent Document 1: JP 2017-147095 Å
Patent Document 2: JP 2017-033866 A
Patent Document 3: JP 2006-294496 A
Patent Document 4: JP 2006-216315 A
Patent Document 5: JP 2005-166594 A

SUMMARY OF THE INVENTION

Problems to be Solved

With the female terminal of Patent Document 1, it is conceivable that, when an external force is applied to the elastic contact plate, a region of a support point part side (one opening side) of the elastic contact plate will be damaged due to increased stress on the support point part side. In particular, the female terminal of Patent Document 1 has a relatively large clearance between the upper and lower edges of the holes and the wings, and thus displacement of the wings increases, and the elastic contact plate is easily deformed.

The present disclosure has been completed based on circumstances such as the above, and an object thereof is to provide a female terminal fitting capable of improving the durability of an elastic contact piece.

Means to Solve the Problem

A female terminal fitting of the present disclosure includes:

a tubular main body part; and an elastic contact piece extending, inside the main body part, from a support point part to a free end part and contacting a partner-side male tab inserted in the main body part, the free end part side of the elastic contact piece displacing in a plate thickness direction of the elastic contact piece, and the main body part having a regulating part that comes in contact with the elastic contact piece and regulates a displacement range of the free end part side to less than or equal to a plate thickness of the elastic contact piece.

Effect of the Invention

According to the present disclosure, a female terminal fitting capable of improving the durability of an elastic contact piece can be provided.

DETAILED DESCRIPTION TO EXECUTE THE INVENTION

Description of Embodiments of Disclosure

Figure 1:
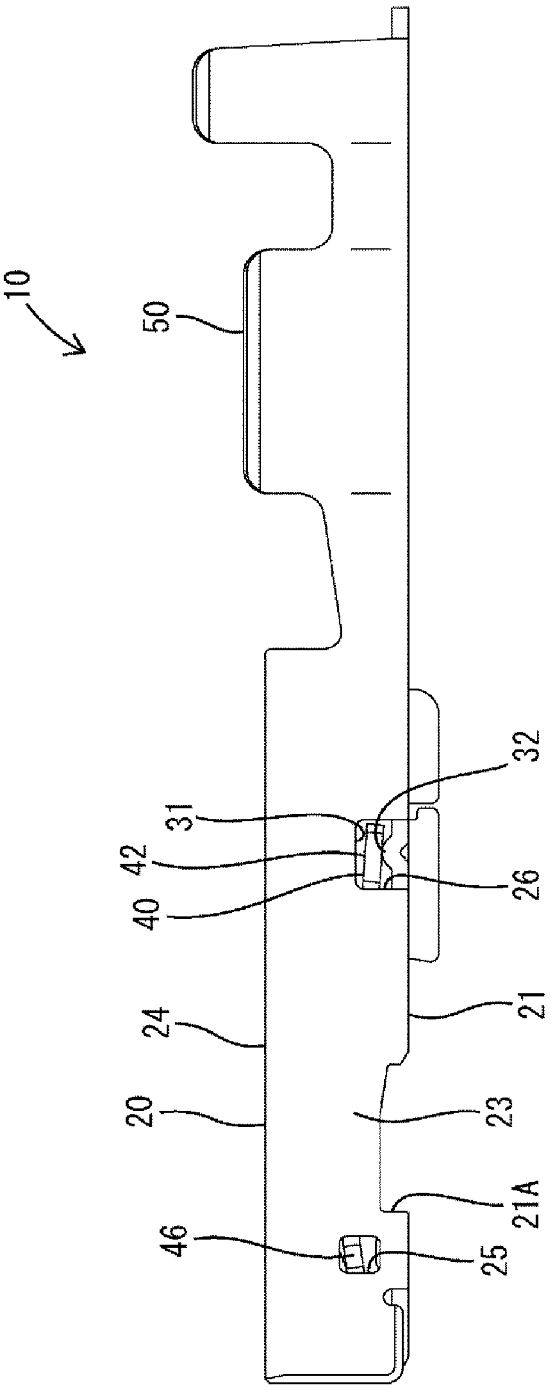
FIG. 1 is a right side view of a female terminal fitting of a first embodiment.

Initially, embodiments of the present disclosure will be enumerated and described.

A female terminal fitting of the present disclosure includes:

(1) a tubular main body part, and an elastic contact piece extending, inside the main body part, from a support point part to a free end part and contacting a partner-side male tab inserted in the main body part, the free end part side of the elastic contact piece displacing in a plate thickness direction of the elastic contact piece, and the main body part having a regulating part that comes in contact with the elastic contact piece and regulates a displacement range of the free end part side to less than or equal to a plate thickness of the elastic contact piece.

By regulating the displacement range of the free end part side of the elastic contact piece to less than or equal to the plate thickness with the regulating part, the displacement amount of the support point part side of the elastic contact piece can be suppressed, as compared with the case where the displacement range is larger than the plate thickness. Thus, stress that occurs on the support point part side when an external force is applied to the elastic contact piece (e.g., when vibration occurs during transportation) can be reduced, and damage to the support point part side is more easily avoided.

(2) Preferably, the elastic contact piece has a projecting part projecting from the free end part side in a width direction, the main body part has a side plate, the side plate is provided with an opening, the projecting part is located within the opening, and an edge part of the opening is constituted as the regulating part.

According to this configuration, the displacement range is regulated to less than or equal to the plate thickness of the elastic contact piece, due to the projecting part coming in contact with the regulating part constituted as an edge part of the opening. In this way, a configuration that regulates displacement of the elastic contact piece can be easily realized by providing an opening in the side plate of the main body part.

(3) Preferably, the main body part has a bottom plate and a side plate standing erect from the bottom plate, the regulating part has a first regulating part provided on an erect side of the side plate and a second regulating part provided at a position on an opposite side to the first regulating part across the free end part, and a distance between the first regulating part and the free end part is larger than a distance between the second regulating part and the free end part.

According to this configuration, the free end part can be prevented from interfering with the first regulating part, when the side plate is erected from the bottom plate.

(4) Preferably, the elastic contact piece has a contact point part that contacts the male tab, and a distance from the support point part to the contact point part is smaller than a distance from the contact point part to the free end part.

According to this configuration, the contact point part can be brought closer to the support point part side, and the displacement amount of the support point part side of the elastic contact piece can be reduced, as compared with a configuration in which the contact point part is brought closer to the free end part side. Thus, stress that occurs on the support point part side when an external force is applied to the elastic contact piece can be further reduced.

Detailed Description of Embodiments of Disclosure

First Embodiment

A first embodiment embodying a female terminal fitting of the present disclosure will be described with reference to FIGS. 1 to 9. In the first embodiment, with regard to the front and rear directions, leftward in FIGS. 1, 4 to 7 and 9 is frontward and rightward is rearward. With regard to the up and down directions, upward and downward as they appear in FIGS. 1 to 3, 6, 8 and 9. With regard to the left and right directions, leftward and rightward are as they appear in FIG. 2.

A female terminal fitting 10 of the first embodiment shown in FIG. 1 is integrally formed by a process such as bending a conductive metal plate, and is connectable to a male terminal fitting 110 on the partner side. The female terminal fitting 10 includes a main body part 20, an elastic contact piece 40 (see FIG. 6, etc.) and a wire connecting part 50. The wire connecting part 50 has an open barrel shape, and a terminal part of an electrical wire is conductively connected by crimping.

Figure 2:
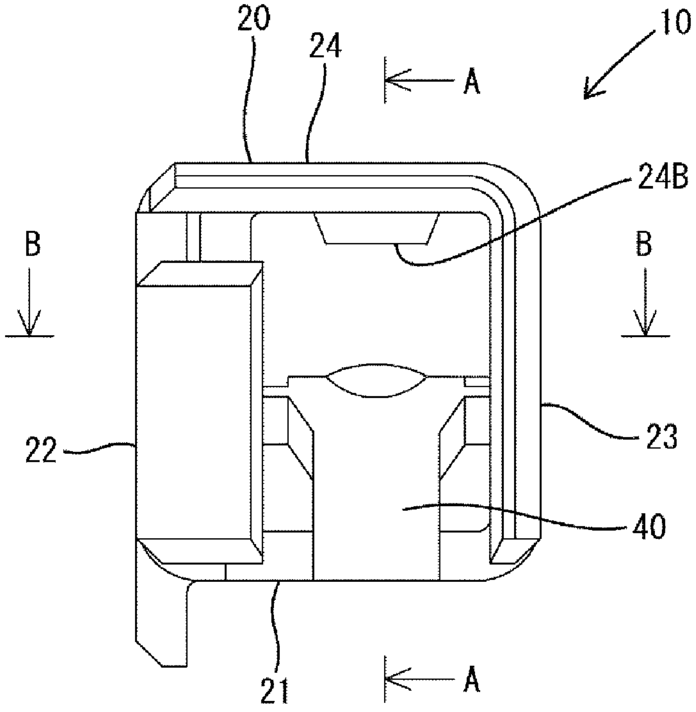
FIG. 2 is a front view of the female terminal fitting.
Figure 3:
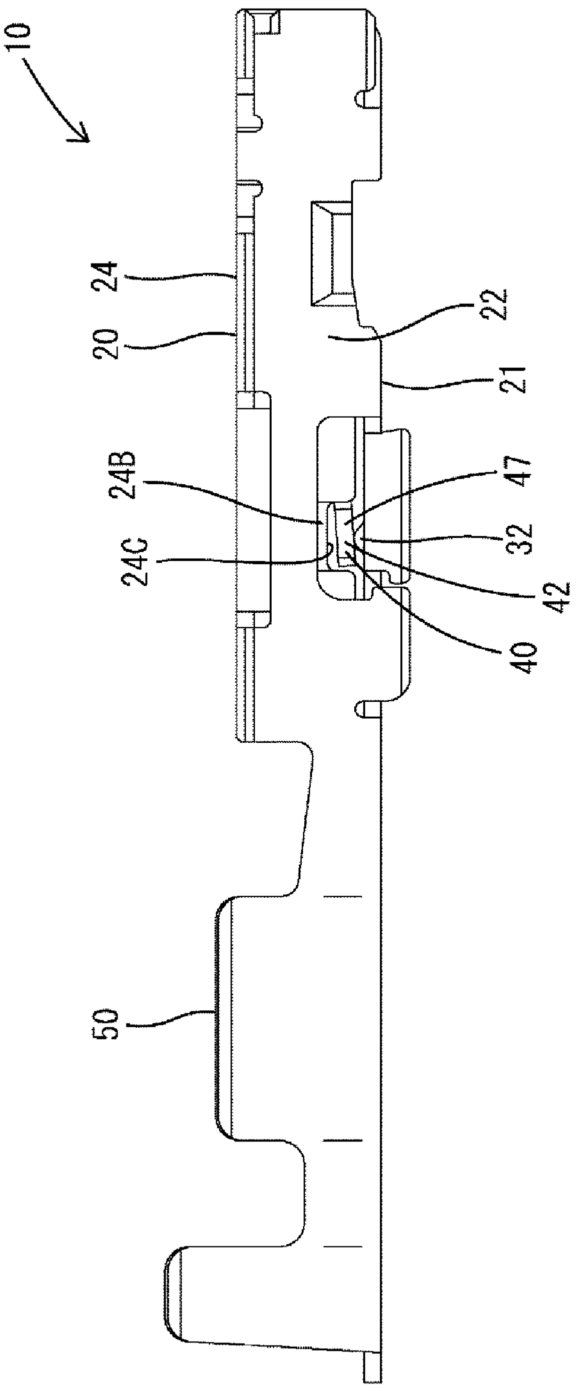
FIG. 3 is a left side view of the female terminal fitting.
Figure 4:
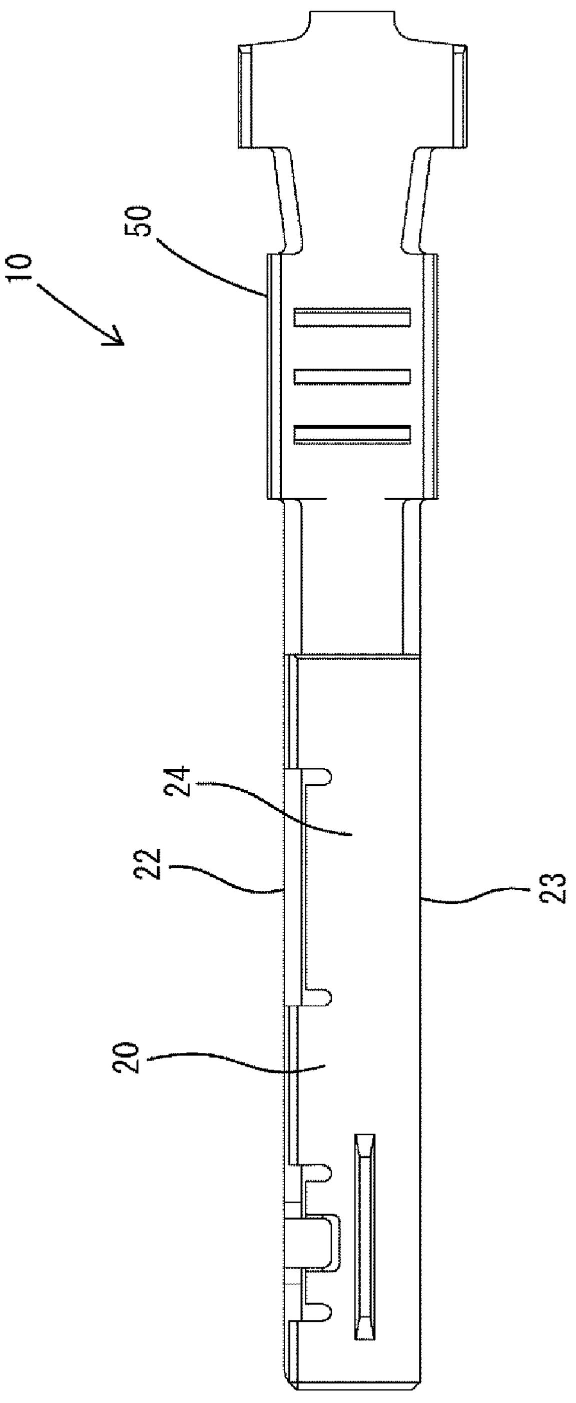
FIG. 4 is a plan view of the female terminal fitting.
Figure 5:
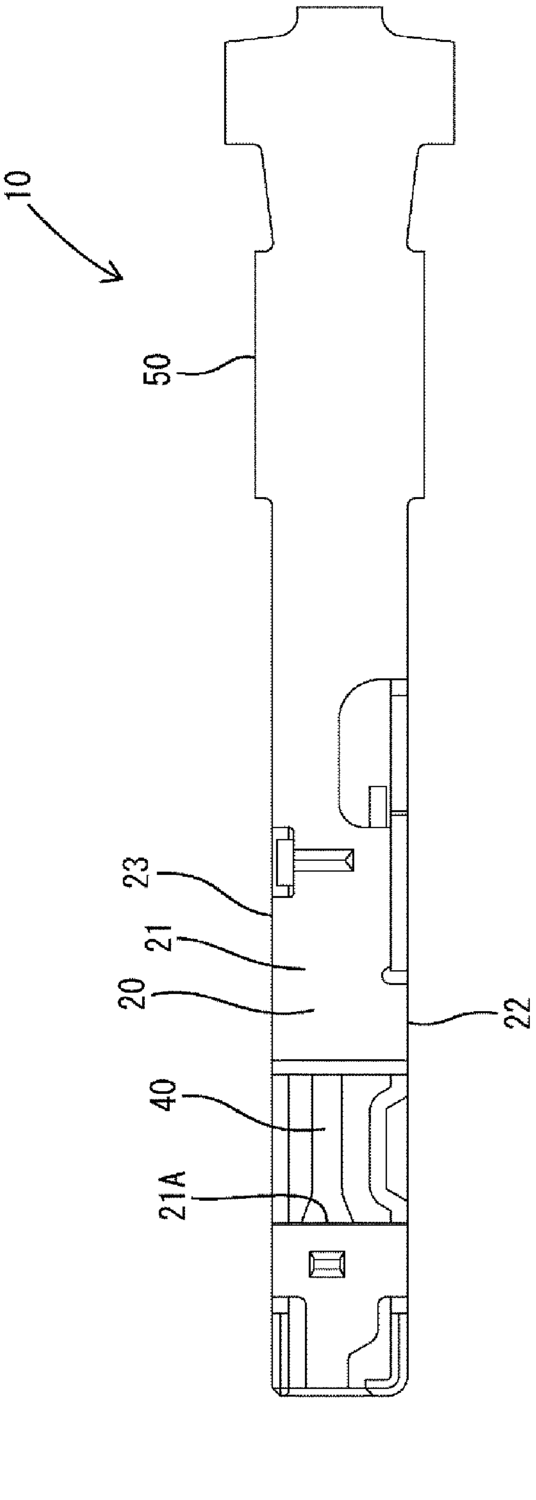
FIG. 5 is a bottom view of the female terminal fitting.
Figure 6:
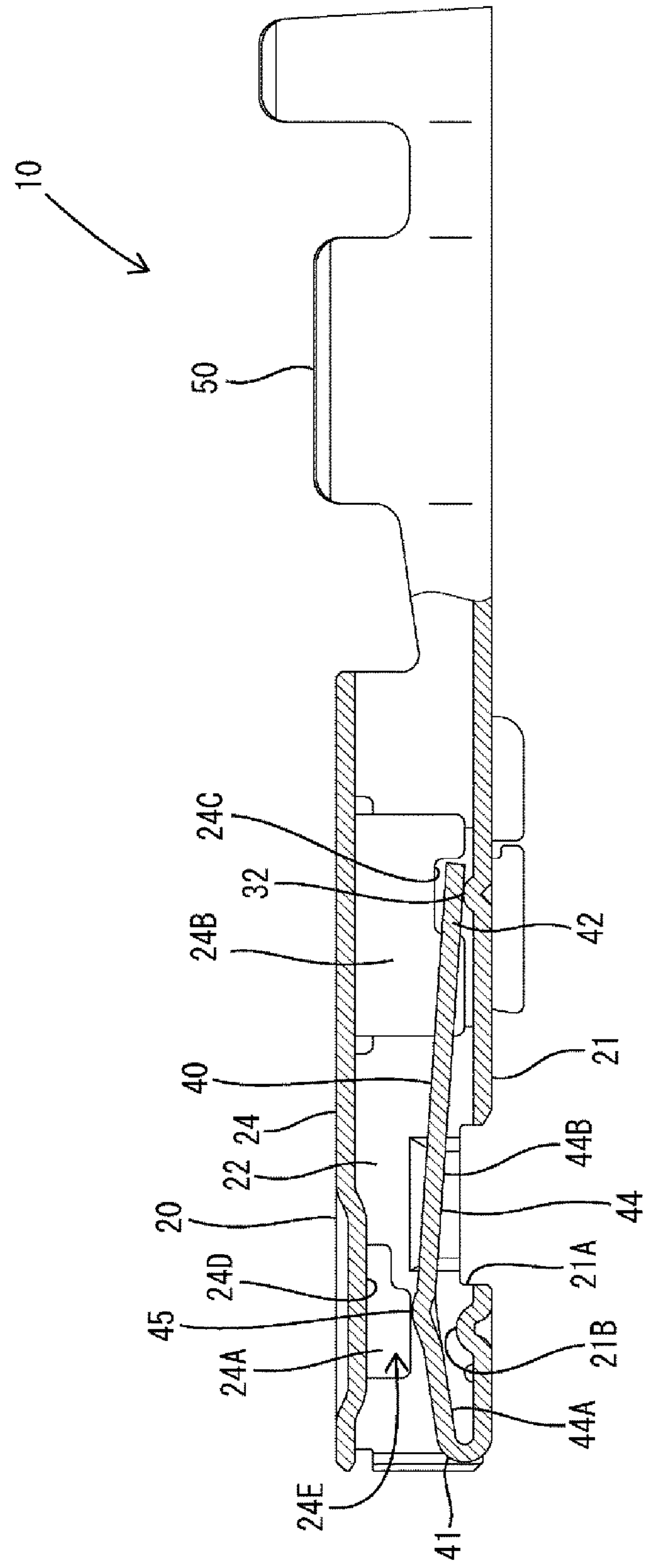
FIG. 6 is a cross-sectional view taken along A-A in FIG. 2.

As shown in FIGS. 1 and 2, the main body part 20 has a rectangular tube shape that is hollow throughout in the front-rear direction. A male tab 120 (see FIG. 9) of the male terminal fitting 110 is inserted into the main body part 20. The main body part 20 includes a bottom plate 21, a left side plate 22 (see FIG. 3), a right side plate 23 and a top plate 24. The bottom plate 21 is a plate that is elongated in the front-rear direction. As shown in FIG. 5, the bottom plate 21 is provided with a lance hole 21A. The lance hole 21A is open in a rectangular shape across the entirety of the bottom plate 21 in the left-right direction. As shown in FIG. 6, the bottom plate 21 is provided with a protruding part 21B on the frontward side of the lance hole 21A. The protruding part 21B is formed by being hammered out from the downward side, for example. The left side plate 22 and the right side plate 23 respectively stand erect from the left and right edges of the bottom plate 21.

The top plate 24 extends from the erect upper end of the right side plate 23 to the left side plate 22 side in parallel with the bottom plate 21. Part of the left edge of the top plate 24 contacts the upper end of the left side plate 22 from the upper side. As shown in FIG. 6, portions of the left edge of the top plate 24 that do not contact the upper end of the left side plate 22 are provided with a front side engaging plate 24A and a rear side engaging plate 24B that extend downward along the inner surface of the left side plate 22 (so as to overlap therewith).

The rear side engaging plate 24B is rectangular as a whole. The lower end of the rear side engaging plate 24B is arranged at a low position (position close to bottom plate 21) in the main body part 20. A middle part of the lower end of the rear side engaging plate 24B in the front-rear direction is provided with a cutout part 24C that is recessed upward.

As shown in FIG. 6, a tab receiving part 24D is formed in the top plate 24 by being downwardly hammered out. A tab entry space 24E for the male tab 120 inserted into the main body part 20 from the front to enter is formed between the lower surface of the tab receiving part 24D and the upper surface of the elastic contact piece 40 described later.

As shown in FIG. 1, the right side plate 23 is respectively provided with a right front opening 25 and a right rear opening 26 at front and rear positions. The right front opening 25 is provided at a position corresponding to the lower end of the front side engaging plate 24A (position overlapping therewith in left-right direction). The right front opening 25 has a rectangular shape. The right rear opening 26 is provided at a position corresponding to the cutout part 24C of the rear side engaging plate 24B (position overlapping therewith in left-right direction). The right rear opening 26 has a rectangular shape corresponding to the cutout part 24C of the rear side engaging plate 24B.

Figure 8:
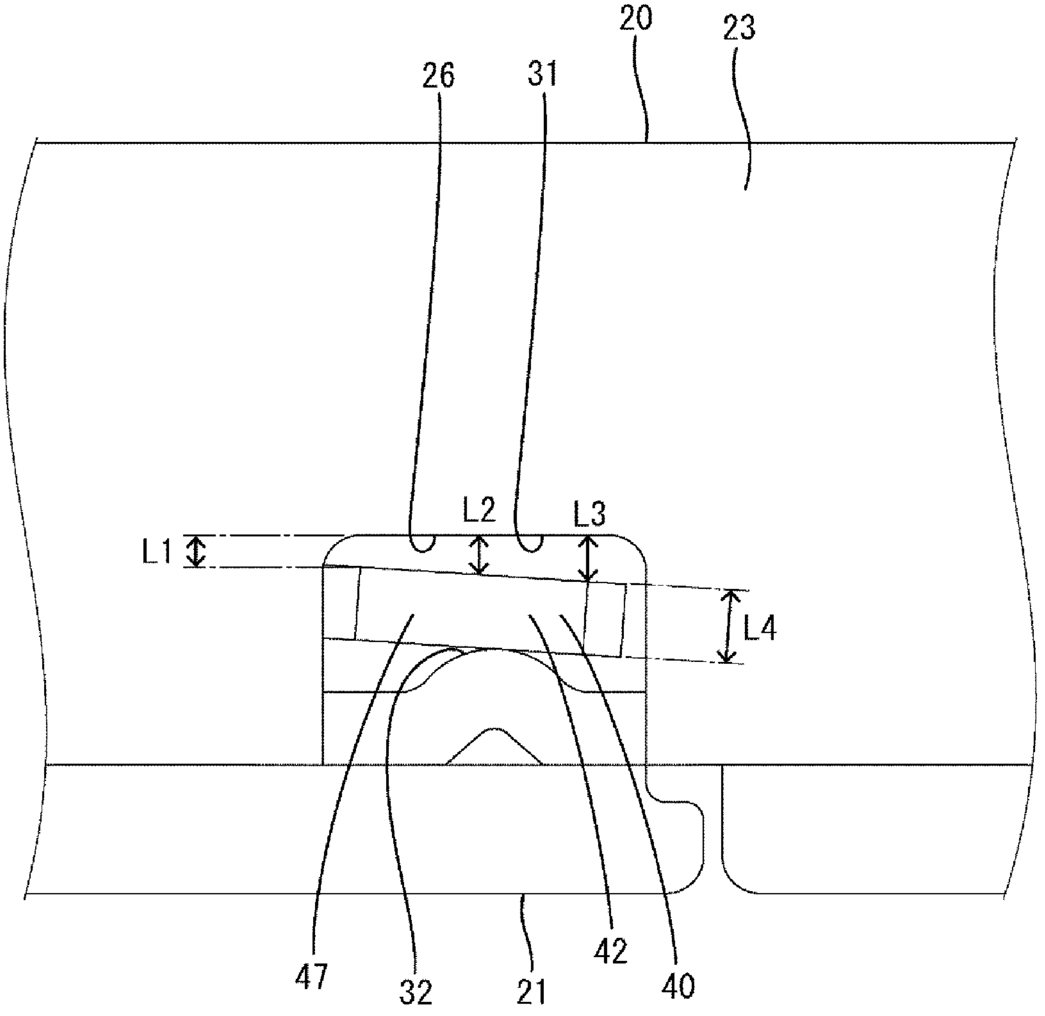
FIG. 8 is an enlarged view showing the periphery of a right rear opening in FIG. 1 in an enlarged manner.
Figure 9:
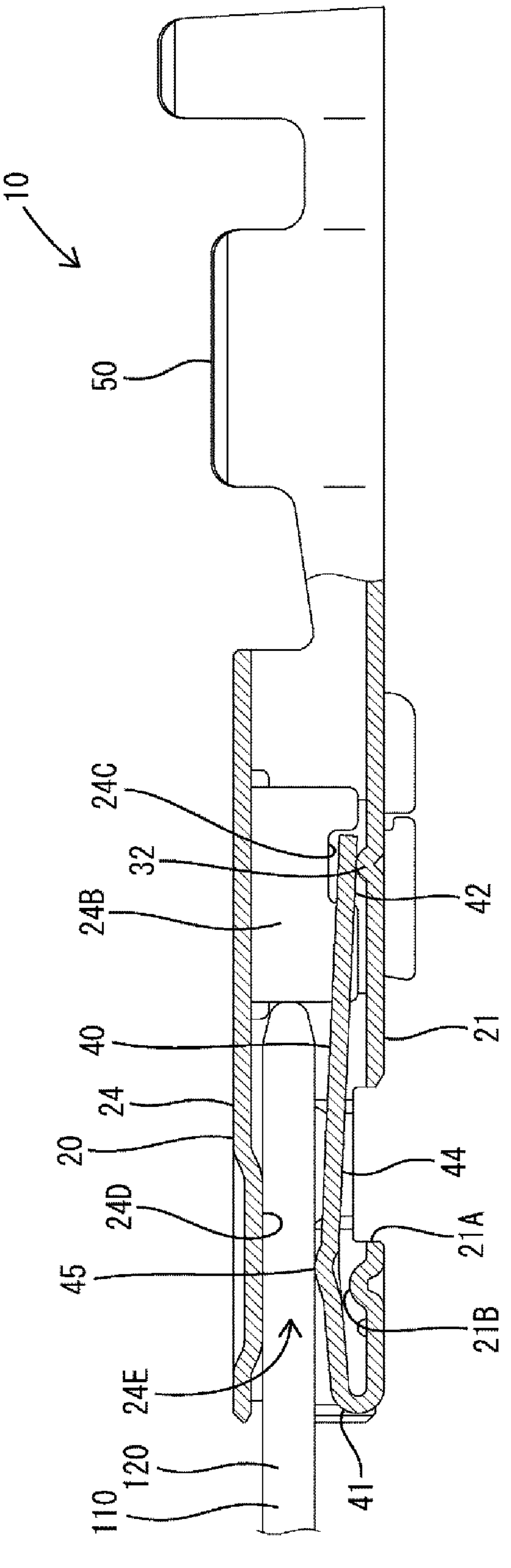
FIG. 9 is an illustrative diagram illustrating a state in which a male tab is inserted in a main body part.

As shown in FIG. 8, the main body part 20 is provided with a first regulating part 31 and a second regulating part 32. The first regulating part 31 and the second regulating part 32 come in contact with the elastic contact piece 40, and regulate a displacement range of a free end part 42 side of the elastic contact piece 40. The first regulating part 31 is provided in the right rear opening 26. The first regulating part 31 is provided on an erect side (upward side) of the right rear opening 26 in the right side plate 23. The first regulating part 31 is constituted by an edge part on the upward side of the right rear opening 26.

As shown in FIG. 8, the second regulating part 32 is provided at a position on an opposite side (downward side)

to the first regulating part 31 across the free end part 42 of the elastic contact piece 40. As shown in FIG. 6, the second regulating part 32 is provided on the bottom plate 21. The second regulating part 32 is provided at a position rearward of the lance hole 21A in the bottom plate 21. The second regulating part 32 supports the elastic contact piece 40 from below. The second regulating part 32 is formed to protrude by being hammered out from the downward side, for example. The second regulating part 32 comes in contact with the free end part 42 of the elastic contact piece 40 that is elastically deflected due to interference with the male tab 120, and supports the elastic contact piece 40.

As shown in FIG. 6, the elastic contact piece 40 is housed within the main body part 20. The elastic contact piece 40 contacts the male tab 120 (see FIG. 9) of the male terminal fitting 110 inserted in the main body part 20. As shown in FIG. 6, the elastic contact piece 40 doubles back from the front end of the bottom plate 21 and extends rearward in a cantilever manner. The elastic contact piece 40 has a shape elongated in the front-rear direction, extending from a support point part (bent part) 41 to the free end part 42. The support point part 41 has a semicircular arc shape continuous with the front end of the bottom plate 21. The elastic contact piece 40 has an extension part 44. The extension part 44 extends rearward from the support point part 41. The extension part 44 is provided with a front inclining part 44A and a rear inclining part 44B. The front inclining part 44A extends rearward diagonally upward from the upper end of the support point part 41. The rear inclining part 44B extends rearward diagonally downward from the rear end of the front inclining part 44A.

In a free state (natural state) in which the elastic contact piece 40 is not elastically deflected, the free end part 42 is in a non-contact position upward of the bottom plate 21. Thus, the elastic contact piece 40 is in a state of being supported in a cantilever manner at the front end thereof by the bottom plate 21. The elastic contact piece 40 can be elastically deformed in the up-down direction while elastically deflecting mainly at the support point part 41, with the support point part 41 as the support point. The free end part 42 side of the elastic contact piece 40 displaces in the plate thickness direction of the elastic contact piece 40. The elastic contact piece 40, when elastically deflected downward, will be supported at both the front and rear ends, due to the free end part 42 coming in contact with the second regulating part 32 of the bottom plate 21.

As shown in FIG. 6, the rear end (highest portion) of the front inclining part 44A is provided with a contact point part 45 in a form upwardly hammered out into a dome shape. The contact point part 45 contacts the male tab 120 (see FIG. 9). The distance from the support point part 41 to the contact point part 45 is smaller than the distance from the contact point part 45 to the free end part 42.

Figure 7:
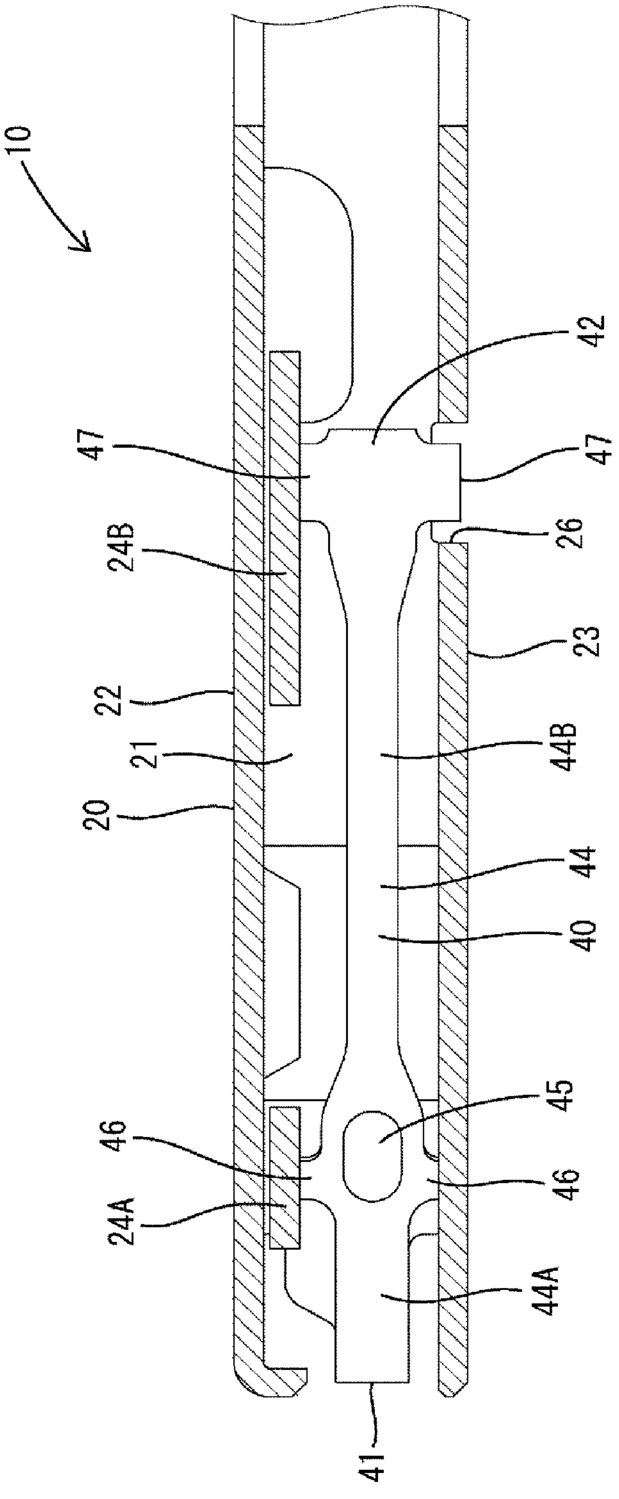
FIG. 7 is a cross-sectional view taken along B-B in FIG. 2.

As shown in FIG. 7, a pair of front side projecting parts 46 and a pair of rear side projecting parts 47 are provided front and rear on left and right edge parts of the elastic contact piece 40. The front side projecting parts 46 and the rear side projecting parts 47 are in a form projecting in a flush manner outwardly in the width direction. The front side projecting parts 46 are arranged in the vicinity of the contact point part 45, that is, in a position slightly frontward of the contact point part 45. The front side projecting parts 46 are positioned so as to correspond to the lower edge part of the front side engaging plate 24A and to the right front opening 25 in the front-rear direction. In the free state (natural state) in which the elastic contact piece 40 is not elastically deflected, the upper surface of the front side projecting part 46 on the left side is in a non-contact position slightly downward of the lower edge part of the front side engaging plate 24A. The upper surface of the front side projecting part 46 on the right side is in a non-contact position slightly downward of the upper edge part of the right front opening 25.

As shown in FIG. 7, the rear side projecting parts 47 project in the width direction (left-right direction) from the free end part 42 side. The rear side projecting parts 47 constitute part of the free end part 42. The rear side projecting parts 47 are positioned so as to correspond to the cutout part 24C of the rear side engaging plate 24B and to the right rear opening 26 in the front-rear direction. The rear side projecting part 47 on the right side is located within the right rear opening 26. In the free state (natural state) in which the elastic contact piece 40 is not elastically deflected, the upper surface of the rear side projecting part 47 on the left side is in a non-contact position slightly downward of the cutout part 24C of the rear contact plate 24B. The upper surface of the rear side projecting part 47 on the right side is in a non-contact position slightly downward of the first regulating part 31. At this time, the distance between the upper surface of the rear side projecting part 47 on the right side and the first regulating part 31 is smaller than the plate thickness of the elastic contact piece 40. The lower surface of the free end part 42 including the rear side projecting part 47 on the left side and the rear side projecting part 47 on the right side contacts the second regulating part 32. Note that the lower surface of the free end part 42 may be in close proximity to the second regulating part 32 rather than in contact therewith.

The first regulating part 31 and the second regulating part 32 come in contact with the elastic contact piece 40, and regulate the displacement range of the free end part 42 side of the elastic contact piece 40 to less than or equal to the plate thickness of the elastic contact piece 40. That is, the free end part 42 of the elastic contact piece 40 displaces by a distance less than or equal to the plate thickness of the elastic contact piece 40 when changing between the state of coming in contact with the first regulating part 31 and the state of coming in contact with the second regulating part 32 (when displacing in up-down direction).

As shown in FIG. 8, the length of the gap between the first regulating part 31 and the free end part 42 (rear side projecting parts 47) in the up-down direction is L1 at a most frontward portion (portion along front edge of rear side projecting parts 47), is L2 at a center portion (center portion of rear side projecting parts 47 in front-rear direction), and is L3 at a most rearward portion (portion along rear edge of rear side projecting parts 47). The lengths (L1, L2, L3) of the gap between the first regulating part 31 and the free end part 42 (rear side projecting parts 47) are smaller than a plate thickness L4 of the elastic contact piece 40.

In the case of the configuration in which the lower surface of the free end part 42 is in close proximity to the second regulating part 32 when the elastic contact piece 40 is in the free state (natural state), the distance between the first regulating part 31 and the free end part 42 is larger than the distance between the second regulating part 32 and the free end part 42.

The gap between the first regulating part 31 and the free end part 42 when the elastic contact piece 40 is in the free state (natural state) gradually increases proceeding rearward. That is, the lengths (L1, L2, L3) of the gap between the first regulating part 31 and the free end part 42 increase in the order L1, L2, L3.

When connecting the male terminal fitting 110 to the female terminal fitting 10, the male tab 120 is inserted into the tab entry space 24E of the main body part 20 from the frontward side. The male tab 120 inserted in the tab entry space 24E is elastically sandwiched between the tab receiving part 24D and the contact point part 45 while elastically deflecting the elastic contact piece 40. The male tab 120 and the main body part 20 are conductively connected due to the elastic restoring force of the elastic contact piece 40.

As described above, the female terminal fitting 10 of the present disclosure is able to suppress the displacement amount of the support point part 41 side of the elastic contact piece 40, as compared with the case where the displacement range is larger than the plate thickness, by regulating the displacement range of the free end part 42 side of the elastic contact piece 40 to less than or equal to the plate thickness with the first regulating part 31 and the second regulating part 32. Thus, stress that occurs on the support point part 41 side when an external force is applied to the elastic contact piece 40 (e.g., when vibration occurs during transportation) can be reduced, and damage to the support point part 41 side is more easily avoided.

In the female terminal fitting 10 of the present disclosure, the displacement range is regulated to less than or equal to the plate thickness of the elastic contact piece 40, due to the rear side projecting part 47 on the right side coming in contact with the first regulating part 31 constituted as an edge part of the right rear opening 26. In this way, a configuration that regulates the displacement of the elastic contact piece 40 can be easily realized by providing an opening in the right side plate 23 of the main body part 20.

In the female terminal fitting 10 of the present disclosure, the distance between the first regulating part 31 and the free end part 42 is larger than the distance between the second regulating part 32 and the free end part 42. With this configuration, the free end part 42 can be prevented from interfering with the first regulating part 31, when the right side plate 23 is erected from the bottom plate 21.

In the female terminal fitting 10 of the present disclosure, the distance from the support point part 41 to the contact point part 45 of the elastic contact piece 40 is smaller than the distance from the contact point part 45 to the free end part 42. With this configuration, the contact point part 45 can be brought closer to the support point part 41 side, and the displacement amount of the support point part 41 side of the elastic contact piece 40 can be reduced, as compared with a configuration in which the contact point part 45 is brought closer to the free end part 42 side. Thus, stress that occurs on the support point part 41 side when an external force is applied to the elastic contact piece 40 can be further reduced.

Second Embodiment

Figure 10:
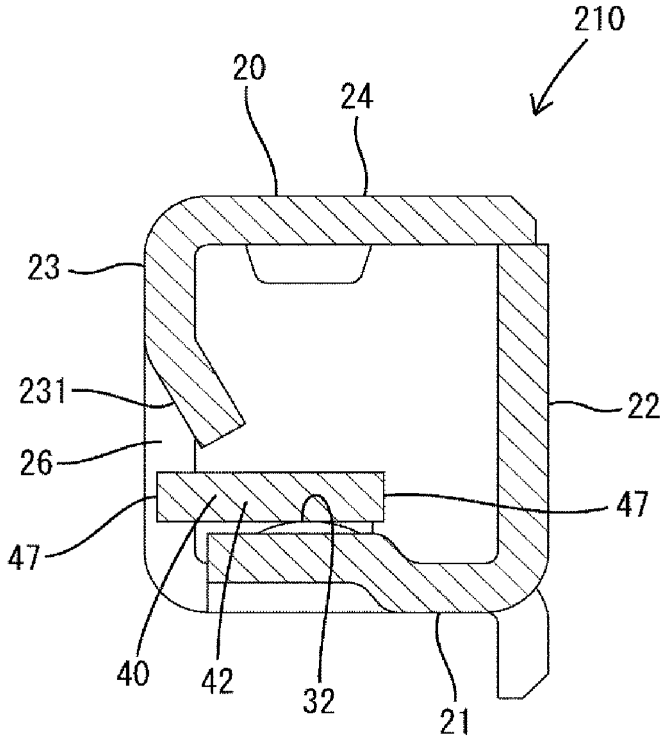
FIG. 10 is a cross-sectional view seen from a back side of the female terminal fitting of a second embodiment.

FIG. 10 is a diagram illustrating a female terminal fitting 210 of a second embodiment. In the second embodiment, the configuration of the first regulating part differs from the first embodiment. The remaining configuration is the same as the first embodiment, and detailed description thereof will be omitted.

As shown in FIG. 10, in the female terminal fitting 210, an upper edge part of the right rear opening 26 is provided with a first regulating part 231. The first regulating part 231 is bent to the inner side of the main body part 20 from the upper edge part of the right rear opening 26. The first regulating part 231 is bent so as to incline relative to the plate surface of the right side plate 23. In the free state (natural state) in which the elastic contact piece 40 is not elastically deflected, the upper surface of the free end part 42 is in a non-contact position slightly downward of the first regulating part 231. At this time, the rear side projecting part 47 on the right side and a portion of the free end part 42 inward of the rear side projecting part 47 on the right side in the left-right direction (portion adjacent to the rear side projecting part 47 on the right side) oppose the first regulating part 231 in the up-down direction.

Figure 11:
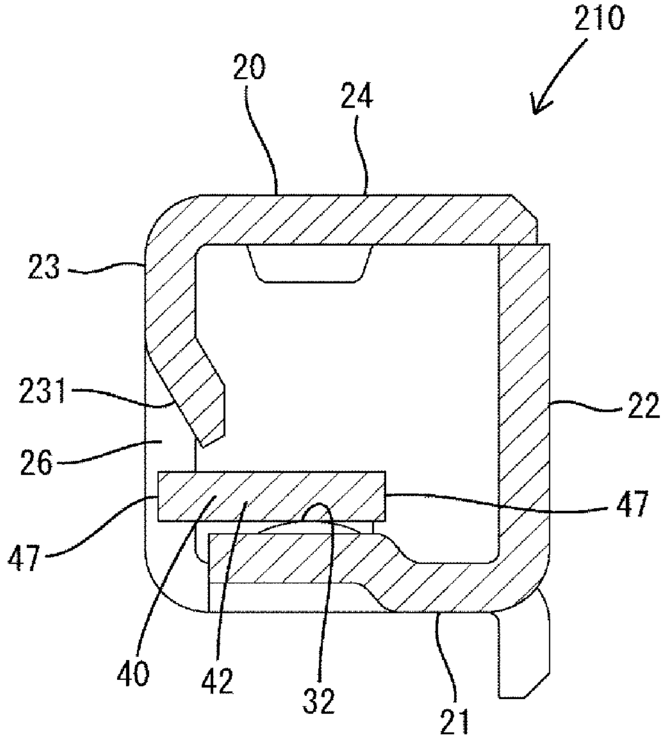
FIG. 11 is an illustrative diagram illustrating a first variation of the female terminal fitting in FIG. 10.
Figure 12:
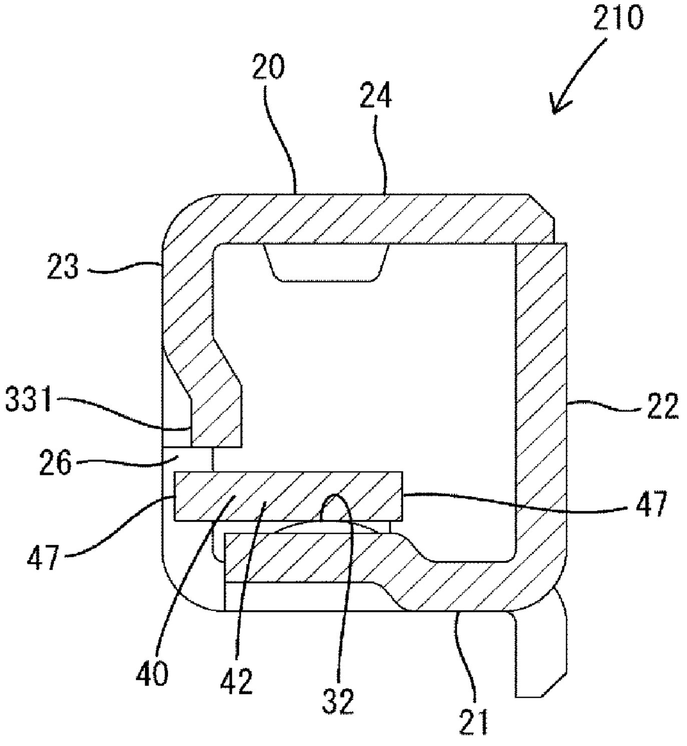
FIG. 12 is an illustrative diagram illustrating a second variation of the female terminal fitting in FIG. 10.

As shown in FIG. 11, the left side portion of the distal end of the first regulating part 231 may be faceted and beveled. As shown in FIG. 12, a first regulating part 331 may be formed by inwardly hammering out part of the right side plate 23.

Third Embodiment

Figure 13:
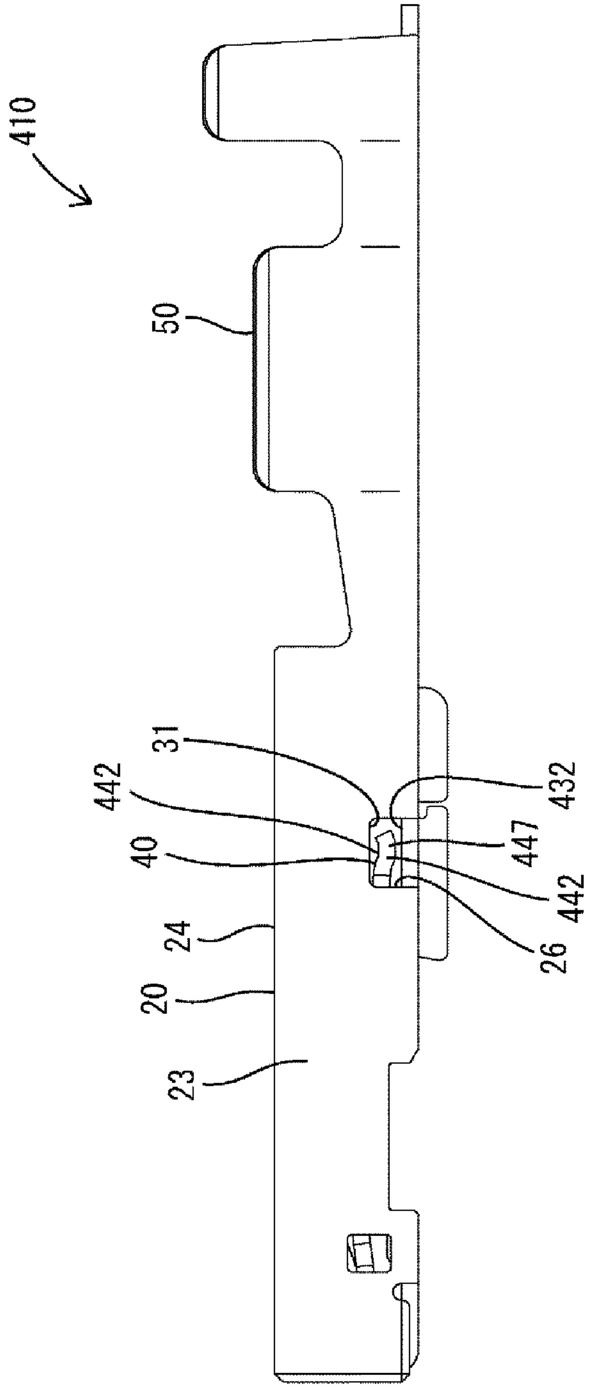
FIG. 13 is a right side view of the female terminal fitting of a third embodiment.
Figure 14:
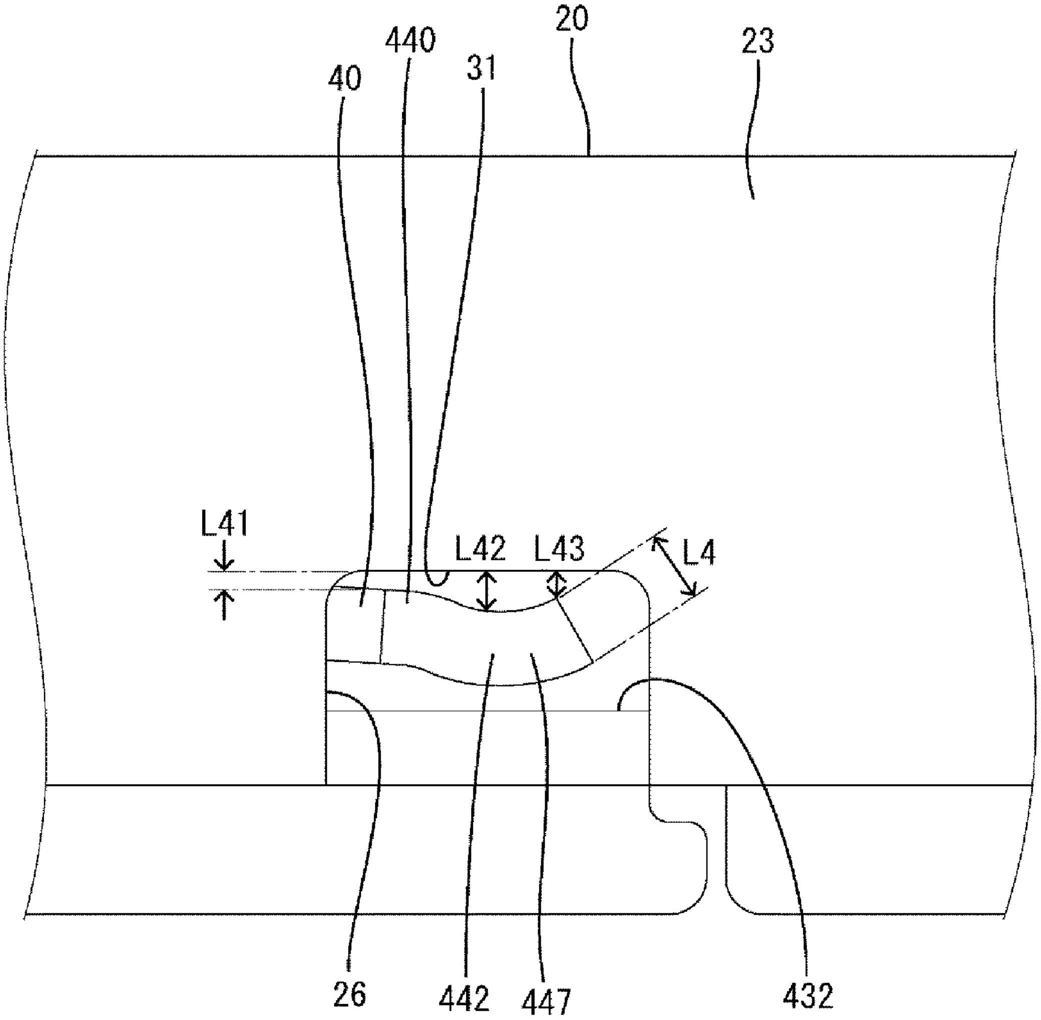
FIG. 14 is an enlarged view showing the periphery of a right rear opening in FIG. 13 in an enlarged manner.

FIGS. 13 and 14 are diagrams illustrating a female terminal fitting 410 of a third embodiment. In the third embodiment, the configurations of the free end part 42 of the elastic contact piece 40 and a second regulating part 432 differ from the first embodiment. The remaining configuration is the same as the first embodiment, and detailed description thereof will be omitted.

As shown in FIGS. 13 and 14, the second regulating part 432 is configured by a portion of the bottom plate 21 corresponding to the right rear opening 26 (portion overlapping with right rear opening 26 in left-right direction). In the elastic contact piece 40, a free end part 442 that includes a pair of rear side projecting parts 447 curves downward in a convex manner.

The first regulating part 31 and the second regulating part 432 come in contact with the elastic contact piece 40, and regulate the displacement range of the free end part 442 side of the elastic contact piece 40 to less than or equal to the plate thickness of the elastic contact piece 40. That is, the free end part 442 of the elastic contact piece 40 displaces by a distance less than or equal to the plate thickness of the elastic contact piece 40 when changing between the state of coming in contact with the first regulating part 31 and the state of coming in contact with the second regulating part 432 (when displacing in up-down direction).

As shown in FIG. 14, the length of the gap between the first regulating part 31 and the free end part 442 (rear side projecting parts 447) in the up-down direction is L41 at a most frontward portion 440 (portion along front edge of rear side projecting parts 447), is L42 at a center portion (center portion of rear side projecting parts 447 in front-rear direction), and is L43 at a most rearward portion (portion along rear edge part of the rear side projecting parts 447). The lengths (L41, L42, L43) of the gap between the first regulating part 31 and the free end part 442 (rear side projecting parts 447) are smaller than the plate thickness L4 of the elastic contact piece 40.

Other Embodiments

The present invention is not limited to the first to third embodiments described above with reference to the drawings, and is defined by the claims. All changes that come within the meaning and range of equivalency of the claims are intended to be embraced in the invention, and embodiments such as the following are also intended to be embraced therein.

In the first embodiment, the first regulating part 31 and the second regulating part 32 are configured to regulate the displacement range of the free end part 42 side of the elastic contact piece 40 to less than or equal to the plate thickness of the elastic contact piece 40. However, the first regulating part 31 and the second regulating part 32 may be configured to regulate the displacement range of the free end part 42 side of the elastic contact piece 40 to less than or equal to half of the plate thickness of the elastic contact piece 40.

LIST OF REFERENCE NUMERALS

10, 210, 410 Female terminal fitting
20 Main body part
21 Bottom plate
21A Lance hole
21B Protruding part
22 Left side plate
23 Right side plate (side plate)
24 Top plate
24A Front side engaging plate
24B Rear side engaging plate
24C Cutout part
24D Tab receiving part
24E Tab entry space
25 Right front opening
26 Right rear opening (opening)
31, 231, 331 First regulating part (regulating part)
32, 432 Second regulating part (regulating part)
40 Elastic contact piece
41 Support point part (bent part)
42, 442 Free end part
44 Extension part
44A Front inclining part
44B Rear inclining part
45 Contact point part
46 Front side projecting part (projecting part)
47, 447 Rear side projecting part (projecting part)
50 Wire connecting part
110 Male terminal fitting
120 Male tab

What is claimed is:

1. A female terminal fitting comprising:
a main body part having a tubular shape; and
an elastic contact piece extending, inside the main body part, from a support point part to a free end part and contacting part, the elastic contact piece configured to contact a partner-side male tab inserted in the main body part,
wherein
a free end part side of the elastic contact piece displaces in a plate thickness direction of the elastic contact piece,
the main body part includes
a regulating part that comes in contact with the elastic contact piece and regulates a displacement range of the free end part side to less than or equal to a plate thickness of the elastic contact piece;
a bottom plate; and
a side plate standing erect from the bottom plate and having an opening for receiving a projecting part of the elastic contact piece, the projecting part projecting from the free end part side in a width direction,
the regulating part includes
a first regulating part provided on an erect side of the side plate and
a second regulating part formed to protrude from the bottom plate at a position opposite to an edge part of the opening of the side plate across the projecting part from the edge part of the opening.

2. The female terminal fitting according to claim 1, wherein
the projecting part is located within the opening, and
the edge part of the opening is constituted as the first regulating part.

3. The female terminal fitting according to claim 1, wherein a distance between the first regulating part and the free end part is larger than a distance between the second regulating part and the free end part.

4. The female terminal fitting according to claim 1, wherein
the elastic contact piece has a contact point part that contacts the partner-side male tab, and
a distance from the support point part to the contact point part is smaller than a distance from the contact point part to the free end part.

5. The female terminal fitting according to claim 1, wherein
the first regulating part is formed by bending an upper edge part of the opening toward an inner side of the main body part to form a bend in the side plate, and
a distal end of the first regulating part opposes the projecting part in an up-down direction.

6. The female terminal fitting according to claim 5, wherein
an inner side portion of the distal end of the first regulating part is faceted and beveled.

7. The female terminal fitting according to claim 1, wherein the first regulating part is formed by inwardly hammering out part of the side plate.

* * * * *